US012775830B2

(12) United States Patent
Aflatouni et al.

(10) Patent No.: US 12,775,830 B2
(45) Date of Patent: Oct. 27, 2026

(54) PHOTONIC-ELECTRONIC DEEP NEURAL NETWORKS

(71) Applicant: THE TRUSTEES OF THE UNIVERSITY OF PENNSYLVANIA, Philadelphia, PA (US)

(72) Inventors: Firooz Aflatouni, Penn Valley, PA (US); Farshid Ashtiani, Chatham, NJ (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 676 days.

(21) Appl. No.: 18/006,158

(22) PCT Filed: Jul. 21, 2021

(86) PCT No.: PCT/US2021/042526
§ 371 (c)(1),
(2) Date: Jan. 20, 2023

(87) PCT Pub. No.: WO2022/020437
PCT Pub. Date: Jan. 27, 2022

(65) Prior Publication Data

US 2023/0316061 A1 Oct. 5, 2023

Related U.S. Application Data

(60) Provisional application No. 63/054,692, filed on Jul. 21, 2020.

(51) Int. Cl.

| | |
|---|---|
| ***G06N 3/00*** | (2023.01) |
| ***G06N 3/048*** | (2023.01) |
| ***G06N 3/067*** | (2006.01) |

(52) U.S. Cl.
CPC ........... *G06N 3/0675* (2013.01); *G06N 3/048* (2023.01)

(58) Field of Classification Search
CPC ...... G06N 3/0675; G06N 3/048; G06N 3/045; G06N 3/0464; G06N 3/084; G06N 3/09; G02F 1/225; G02F 2201/302
See application file for complete search history.

(56) References Cited

U.S. PATENT DOCUMENTS

| | | | |
|---|---|---|---|
| 5,625,734 | A | 4/1997 | Thomas et al. |
| 5,818,618 | A | 10/1998 | Eastmond |

(Continued)

FOREIGN PATENT DOCUMENTS

| | | | |
|---|---|---|---|
| CN | 106815601 | A | 6/2017 |
| CN | 107122708 | A | 9/2017 |

(Continued)

OTHER PUBLICATIONS

Machine Translation of JP H07210530A, by Takei, Published on Aug. 11, 1995. (Year: 1995).*

(Continued)

*Primary Examiner* — Mahesh H Dwivedi
(74) *Attorney, Agent, or Firm* — BakerHostetler

(57) ABSTRACT

Provided are systems and methods for photonic-electronic neural network computation. In an embodiment, arrays of input data are processed in an optical domain and applied through a plurality of photonic-electronic neuron layers, such as in a neural network. The data may be passed through one or more convolution cells, training layers, and classification layers to generate output information. In embodiments, various types of input data, e.g., audio, video, speech, analog, digital, etc., may be directly processed in the optical domain and applied to any numbers of layers and neurons in various neural network configurations. Such systems and (Continued)

methods may also be integrated with one or more photonic-electronic systems, including but not limited to 3D imagers, optical phased arrays, photonic assisted microwave imagers, high data-rate photonic links, and photonic neural networks.

21 Claims, 14 Drawing Sheets

(56) References Cited

U.S. PATENT DOCUMENTS

| | | | | |
|---|---|---|---|---|
| 5,978,526 | A | 11/1999 | Morikuni et al. | |
| 6,634,802 | B2 | 10/2003 | Brezina et al. | |
| 6,640,021 | B2 | 10/2003 | Pogge et al. | |
| 6,842,571 | B2 | 1/2005 | Kramer et al. | |
| 7,113,761 | B2 | 9/2006 | Bickham et al. | |
| 7,123,789 | B2 | 10/2006 | Gorni et al. | |
| 7,133,588 | B2 | 11/2006 | Romagnoli et al. | |
| 7,209,607 | B2 | 4/2007 | Martinelli et al. | |
| 7,233,729 | B2 | 6/2007 | Romagnoli et al. | |
| 7,286,770 | B2 | 10/2007 | Doyle et al. | |
| 7,346,239 | B2 | 3/2008 | Romagnoli et al. | |
| 7,356,219 | B2 | 4/2008 | Faccio et al. | |
| 7,600,925 | B2 | 10/2009 | Alameh et al. | |
| 7,706,645 | B2 | 4/2010 | Zeiger et al. | |
| 8,712,251 | B2 | 4/2014 | Koley et al. | |
| 8,792,787 | B1 | 7/2014 | Zhao et al. | |
| 8,867,376 | B1 | 10/2014 | Gandham et al. | |
| 8,867,915 | B1 | 10/2014 | Vahdat et al. | |
| 8,891,971 | B1 | 11/2014 | Liu et al. | |
| 8,909,064 | B2 | 12/2014 | Koley et al. | |
| 9,167,322 | B1 | 10/2015 | Zhao et al. | |
| 9,184,845 | B1 | 11/2015 | Vahdat et al. | |
| 9,185,475 | B1 | 11/2015 | Liu et al. | |
| 9,247,326 | B2 | 1/2016 | Urata et al. | |
| 9,473,833 | B2 | 10/2016 | Urata et al. | |
| 9,491,526 | B1 | 11/2016 | Zhao et al. | |
| 10,317,626 | B2 | 6/2019 | Yasumura et al. | |
| 10,771,180 | B1 | 9/2020 | Schmogrow et al. | |
| 11,042,416 | B2 | 6/2021 | Patil et al. | |
| 11,122,347 | B2 | 9/2021 | Willcock | |
| 11,264,358 | B2 | 3/2022 | Kwon et al. | |
| 11,392,830 | B2 * | 7/2022 | Ozcan | G06N 3/082 |
| 11,451,889 | B2 | 9/2022 | Willcock | |
| 11,516,087 | B2 | 11/2022 | Towles | |
| 11,537,443 | B2 | 12/2022 | Patil et al. | |
| 11,978,721 | B2 | 5/2024 | Kwon et al. | |
| 12,040,949 | B2 | 7/2024 | Towles | |
| 12,182,628 | B2 | 12/2024 | Patil et al. | |
| 12,327,817 | B2 | 6/2025 | Kwon et al. | |
| 2007/0258715 | A1 | 11/2007 | Androni et al. | |
| 2017/0351293 | A1 | 12/2017 | Carolan et al. | |
| 2018/0299628 | A1 | 10/2018 | Liu et al. | |
| 2019/0370652 | A1 | 12/2019 | Shen et al. | |
| 2020/0311550 | A1 * | 10/2020 | Hu | G06N 3/082 |
| 2020/0320685 | A1 * | 10/2020 | Anssari Moin | G06N 3/08 |
| 2021/0116781 | A1 * | 4/2021 | Hughes | H03K 3/42 |
| 2022/0300796 | A1 * | 9/2022 | Zipp | G02F 1/0151 |
| 2025/0264677 | A1 | 8/2025 | Kwon et al. | |

FOREIGN PATENT DOCUMENTS

| | | | |
|---|---|---|---|
| CN | 107480782 | A | 12/2017 |
| CN | 109254350 | A | 1/2019 |
| CN | 109359702 | A | 2/2019 |
| CN | 109477938 | A | 3/2019 |
| CN | 109685126 | A | 4/2019 |
| CN | 109784485 | A | 5/2019 |
| CN | 109784486 | A | 5/2019 |
| CN | 109887018 | A | 6/2019 |
| CN | 110866425 | A | 3/2020 |
| CN | 111191736 | A | 5/2020 |
| CN | 111310511 | A | 6/2020 |
| JP | H07210530 | A * | 8/1995 |
| JP | 2020-079980 | A | 5/2020 |
| WO | 2019/217835 | A1 | 11/2019 |
| WO | 2020/101863 | A2 | 5/2020 |

OTHER PUBLICATIONS

Article entitled "Image Classification with a 3-Layer SOA-Based Photonic Integrated Neural Network", by Shi et al., dated 2019 (Year: 2019).*

Aflatouni et al., "Nanophotonic coherent imager," Optics Express, 2015, vol. 23, No. 4, pp. 5117-5125.

Aflatouni et al., "Nanophotonic projection system," Optics Express, 2015, vol. 23, No. 16, pp. 21012-21022.

Ashtiani et al., "High-resolution optical frequency synthesis using an integrated electro-optical phase-locked loop," in IEEE Transactions on Microwave Theory and Techniques, 2018, vol. 66, No. 12, pp. 5922-5932.

Ashtiani et al., "Single-chip nanophotonic near-field imager," Optica, 2019, vol. 6, No. 10, pp. 1255-1260.

Hamerly et al. "Large-scale optical neural networks based on photoelectric multiplication," Physical Review X 9.2 (2019): 021032. May 16, 2019, Retrieved on Oct. 3, 2021, pp. 1-12.

Idjadi et al., "Integrated Pound-Drever Hall laser stabilization system in silicon", Nature Communications, 2017, vol. 8, No. 1209, pp. 1-9.

Idjadi et al., "Nanophotonic phase noise filter in silicon," Nature Photonics, 2020, vol. 14, pp. 234-239.

Lugnan et al, "Photonic neuromorphic information processing and reservoir computing," APL Photonics 5.2 (2020): 020901. Feb. 4, 2020, Retrieved on Oct. 3, 2021. pp. 1-15.

Miscuglio et al, "Roadmap on material-function mapping for photonic-lectronic hybrid neural networks," APL Materials 7.10 (2019): 100903. Oct. 10, 2019 (Oct. 10, 2019) Retrieved on Oct. 3, 2021. pp. 1-14.

Nvidia CUDA Programming Guide (Versions 4.2 and 9) available at https: //developer. download.nvidia.com, 2012, pp. 1-173.

Soures et al. "Neuro-MMI: a hybrid photonic-electronic machine learning platform," 2018 IEEE Photonics Society Summer Topical Meeting Series (SUM). IEEE, 2018, pp. 1-2.

Tariq Rashid, "Make you own neural network", CreateSpace Independent Publishing Platform, 2016, 233 pages.

Xuan et al., "Frequency locking of semiconductor lasers to RF oscillators using hybrid-integrated opto-electronic oscillators with dispersive delay lines", Optics Express, 2019, vol. 27, No. 8, pp. 10729-10737.

Xuan et al., "A low-power hybrid-integrated 40 GB/s optical receiver in silicon", IEEE Transactions on Microwave Theory and Techniques (TMTT), 2018, vol. 66, No. 1, pp. 589-595.

Bagherian et al., "On-Chip Optical Convolutional Neural Networks", Aug. 16, 2018, pp. 1-18.

Shi et al., "Deep Neural Network Through an InP SOA-Based Photonic Integrated Cross-Connect", IEEE Journal of Selected Topics in Quantum Electronics, vol. 26, No. 1 Jan. 1, 2020, pp. 12.

Sui et al., "A Review of Optical Neural Networks", IEEE Access, Apr. 28, 2020, vol. 8, pp. 70773-70783.

George et al., Neural Network Activation Functions with Electro-Optic Absorption Modulators, 2018 IEEE International Conference on Rebooting Computing (ICRC), McLean, VA, USA, 2018, pp. 1-5.

Xiukai et al., Adaptive Blind Equalization Method Based on Electrical-Domain Feedback Neural Networks, Acta Optica Sinica, vol. 33, No. 5, May 2013, 12 pages (with English Abstract).

George et al., "Neural Network Activation Functions with Electro-optic Absorption Modulators", IEEE International Conference on Rebooting Computing, 2018, Pages 5.

Xiukai et al., Adaptive Blind Equalization Using Electrical Recurrent Neural Networks, Acta Optica Sinica, vol. 33, No. 5, 2013, pp. 1-12.

* cited by examiner

RM: ring modulator
PM: phase modulator
OC: optical combiner

PHOTONIC-ELECTRONIC DEEP NEURAL NETWORKS

CROSS-REFERENCE TO RELATED APPLICATIONS

This application is the National Stage Application of International Patent Application No. PCT/US2021/042526 (filed Jul. 21, 2021) which claims priority to and the benefit of U.S. patent application No. 63/054,692, "Photonic-Electronic Deep Networks" (filed Jul. 21, 2020), the entirety of which is incorporated herein by reference for any and all purposes.

GOVERNMENT RIGHTS

This invention was made with government support under N00014-19-1-2248 awarded by the Office of Naval Research. The government has certain rights in the invention.

TECHNICAL FIELD

The present disclosure relates generally to the field of photonic devices and neural networks and artificial intelligence, in particular to systems and methods for fully or partially processing data in the optical domain in neural networks.

BACKGROUND

Neural networks are often utilized for data classification including image, video, and 3D objects. In conventional photonic neural network implementations, there are significant computational challenges when analyzing large data sets, which may include optical, image, and other data. For example, raw optical data is often analyzed using an image sensor serving as a pixel array, through methods such as photo-detection and digitization. Larger data sets, such as those with a large number of input pixels, computational load quickly becomes great and processing times are lengthened, as the data is passed through a plurality of neural network layers. In addition, optical power drops significantly from layer to layer in these processes, which together with other implementation difficulties, makes realization of non-linear functions challenging. Hence, only a limited number of neuron layers can be implemented before the computational, power costs, and non-linear functionality become overly burdensome. Thus, there is a need for improved neural networks, and in particular, for neural networks able to process different types of data.

SUMMARY

The present disclosure provides systems and methods for photonic-electronic neural network computation. Embodiments provide the direct processing of raw optical data and/or conversion of various types of input data to the optical domain, and application into neural networks. Through the direct use of data in the optical domain, disclosed systems and methods are able to significantly reduce processing time and computational load, compared to traditional neural network implementations. In various examples, both processing time and power consumption are orders of magnitude lower than conventional methods.

In an embodiment, arrays of input data are processed in an optical domain and applied through a plurality of photonic-electronic neuron layers, such as in a neural network. The data may be passed through one or more convolution cells, training layers, and classification layers to generate output information. Various types of input data, e.g., audio, video, speech, analog, digital, etc., may be directly processed in the optical domain and applied to any numbers of layers and neurons in various neural network configurations. Systems and methods may also be integrated with one or more photonic-electronic systems, including but not limited to 3D imagers, optical phased arrays, photonic assisted microwave imagers, high data-rate photonic links, and photonic neural networks.

BRIEF DESCRIPTION OF THE DRAWINGS

The appended drawings are illustrative only and are not necessarily drawn to scale. In the drawings.

DETAILED DESCRIPTION OF ILLUSTRATIVE EMBODIMENTS

Figures 1A, 1B:
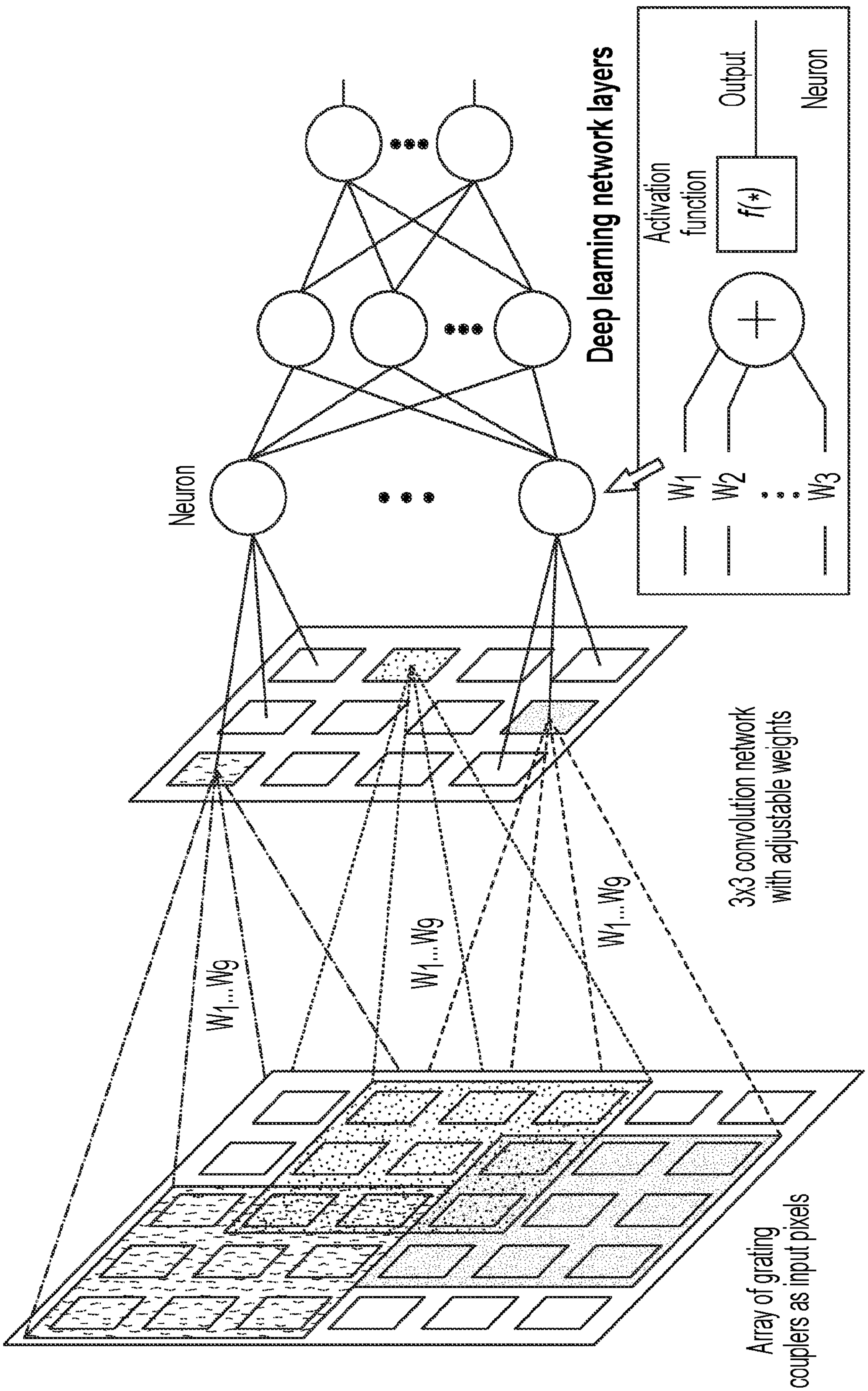
FIGS. 1A-1B provide (FIG. 1A) a general architecture of a convolutional deep learning network and (FIG. 1B) a schematic of a conventional neuron.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

Building on work on large scale integrated electronic-photonic systems including 3D imagers, optical phased arrays, photonic assisted microwave imagers, high data-rate photonic links, and photonic neural networks, the inventors have been designing and implementing multi-layer integrated photonic-mmWave deep neural networks for image, video, and 3D object classification. In the disclosed system, images are taken using an array of pixels and directly processed in the optical domain for both or either learning and classification phases with part of the processing (including the non-linear function) is performed in electrical (analog, digital, RF, mm-wave, . . . ) blocks. The invention also include processing of other types of input data including but not limited to audio, video, speech, and/or the analog or digital representation of any type of data.

Compared to the state-of-the-art GPU based systems, the disclosed architecture, which can be implemented at any number of layers and neurons in many different configurations, directly processes the raw optical data or any type of data after up-conversion to optical domain (without photo-detection/digitization) with orders-of magnitude faster processing time, orders-of-magnitude lower power consumption, and scalability to complex practical deep networks.

Unlike recent implementations of photonic neural networks, where optical power drops significantly layer by layer (hence a limited number of neuron layers can be implemented), the disclosed monolithic electronic-photonic system (1) contains several neuron layers and can be utilized in practical applications, (2) utilizes strong and programmable yet ultra-fast mmWave non-linear function, and (3) is highly scalable to many layers as the same optical power is available to each layer.

The inventors have already designed and successfully measured many blocks of this system such as photonic-mmWave neuron, non-linear function, 3D imager front-end, and have taped-out the first version of the multi-layer deep network to be demonstrated in the course of the competition. Chip simulations show 280 ps classification time (per frame) and 2 ns training time (per iteration).

The inventors disclose a design and implementation of an integrated photonic deep neural networks for image, video, and 3D object classification. While the disclosed integrated photonic architecture directly processes the raw optical (image) data collected at the input pixels, which significantly reduces the system complexity and power consumption by eliminating the photo-detection and digitization of the input image data, it can also be used for other types of data after up-conversion to optical domain. FIG. 1A shows one embodiment of the general architecture of a convolutional deep learning network, where the input image is formed on a pixel array (image sensor) photo-detected and digitized. The sensor array digital outputs are organized into a matrix to compute the image correlation with a sliding window represented by a weight matrix (e.g. performing edge detection, averaging or other operations), where the weighted sum of the pixels within the window are calculated and used as the corresponding element of the correlation output matrix.

The elements of the correlation output matrix are arranged and fed to the neurons in the first layer (i.e. input layer) of the neural network. Besides the input layer, the typical deep network architecture is composed of an output layer and intermediate "hidden" layers. For networks with large number of input pixels, multiple convolution layers can be used to further lower the computation load. FIG. 1B shows the schematic of a typical neuron in the input layer where input signals are multiplied by the corresponding weights, summed, and passed through a non-linear function, the activation function, to generate the neuron output. The weights within each neuron are calculated during the supervised training process and are used during the classification process to assign the input image to one of the defined classes. In the disclosed clock-less photonic deep learning network architecture, once the image is formed on the input pixel array, instead of photo-detection and digitization (which is conventionally done in an image sensor) the processing is done directly in the optical domain. As the first step of this disclosed, the inventors have taped-out a 3-layer photonic neural network at 1550 nm for classification of 6×5-pixel handwritten numbers. The second step includes the implementation of a reconfigurable and scalable large photonic-electronic deep networks with photonic training and classification for 28×28-pixel images or larger images. In the third step, the inventors turn the input pixel array to an optical phased array that is used with a frequency chirped laser to perform 3D object detection (see [5]) and classification.

Figure 2:
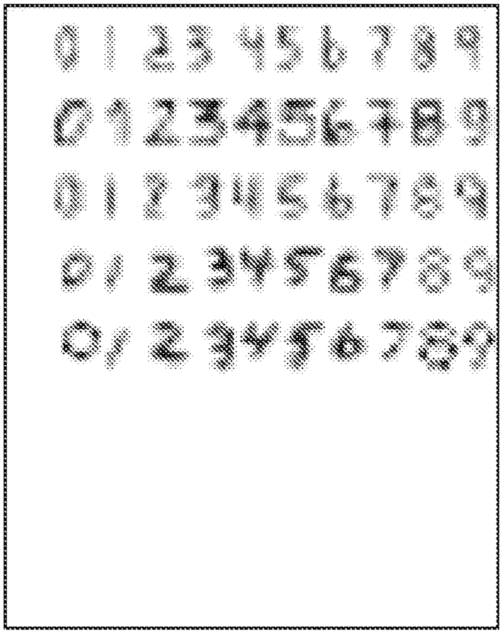
FIG. 2 provides sample images of 6×5 pixel handwritten numbers.
Figure 3A:
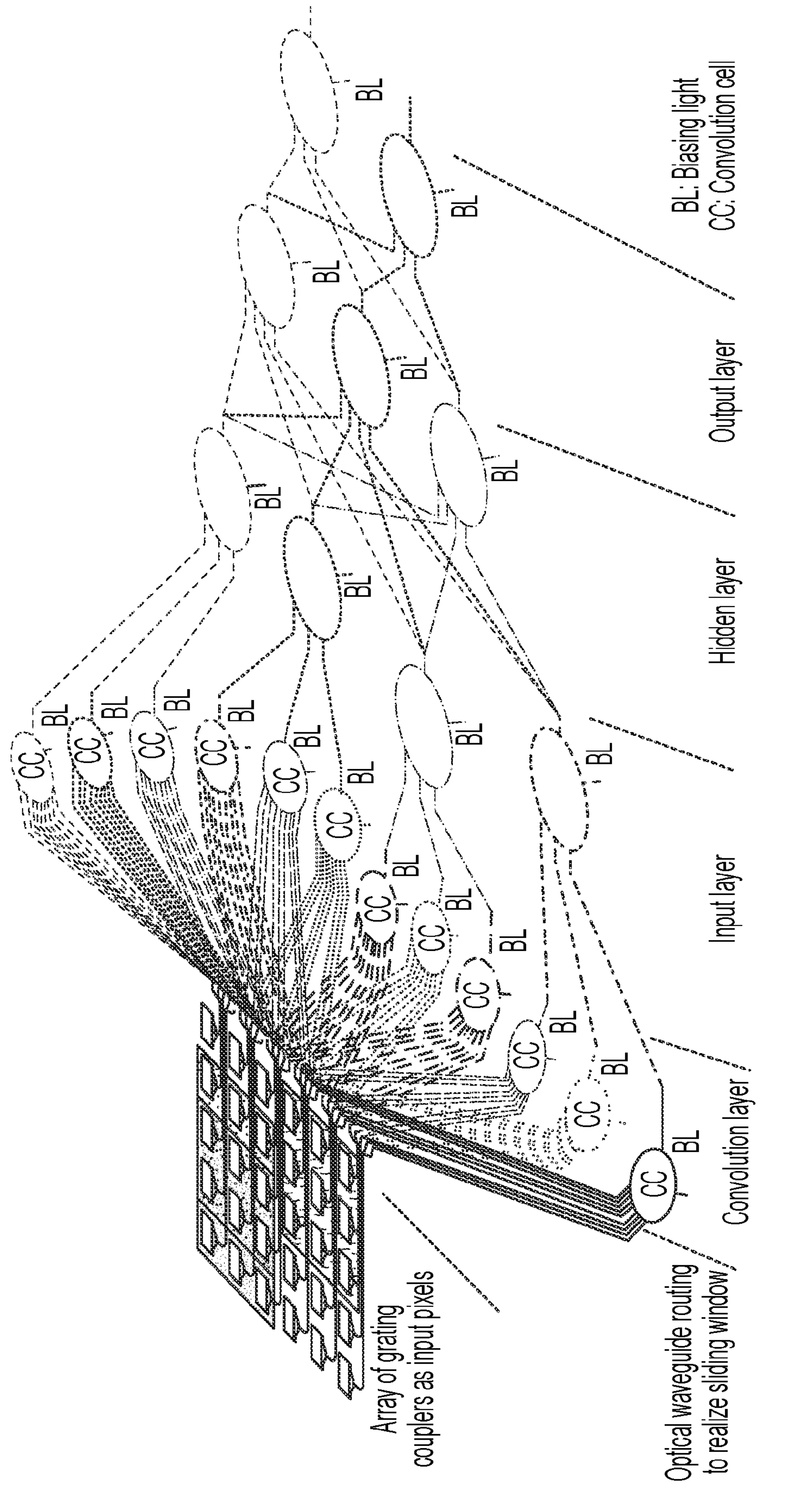
FIGS. 3A-3C provide (FIG. 3A) an exemplary structure of the disclosed class of photonic deep learning networks, (FIG. 3B) an example structure of the disclosed convolution cell, and (FIG. 3C) an example schematic of the disclosed photonic-electronic neuron for forward propagation.

Sample images of hand-written numbers (for step 1) are shown in FIG. 2. FIG. 3A shows one embodiment of the structure of a photonic deep learning network, while here a 6×5 array of photonic grating couplers is shown, different number, configurations, type, size, and material can be used to implement the receiving elements, serving as input pixels, to couple the light into nanophotonic waveguides.

To realize the convolution layer using overlapping sliding windows, a photonic waveguide network is designed to route the optical signals from twelve 3×3 overlapping windows of pixels to an array of convolution cells (CC). Different size and type of windows can be used. Each 3×3 waveguide array forms the inputs of a convolution cell. Within each CC, the inner product of input optical signals and the pre-programmed 3×3 convolution matrix is photonically calculated. The outputs of the 12 convolution cells are arranged and routed to four photonic-electronic neurons (i.e. 3 inputs per neuron) forming the input layer of the deep learning network. Within each photonic-electronic neuron, the input optical waves are combined after their amplitudes are adjusted according to the weight associated with each input. The non-linear activation function is realized in electro-optical or electrical domain and the signal is up-converted back to the optical domain to form the neuron output. Additional devices and systems within each neuron are implemented enabling the electronic-photonic neuron to be used in both forward propagation (in the classification phase) and the backward propagation (in the training phase). The second layer, the hidden layer, composed of three 4-input photonic-electronic neurons and is followed by the output layer with two photonic-electronic neurons. This photonic deep neural network will be used to perform 2-class classification of images. For example, the system can be trained with images of two digits (e.g. "0" and "2") and used to classify the images of these two digits. The details of each component of the architecture in FIG. 3A are discussed next.

Convolution Cell

Figure 3B:
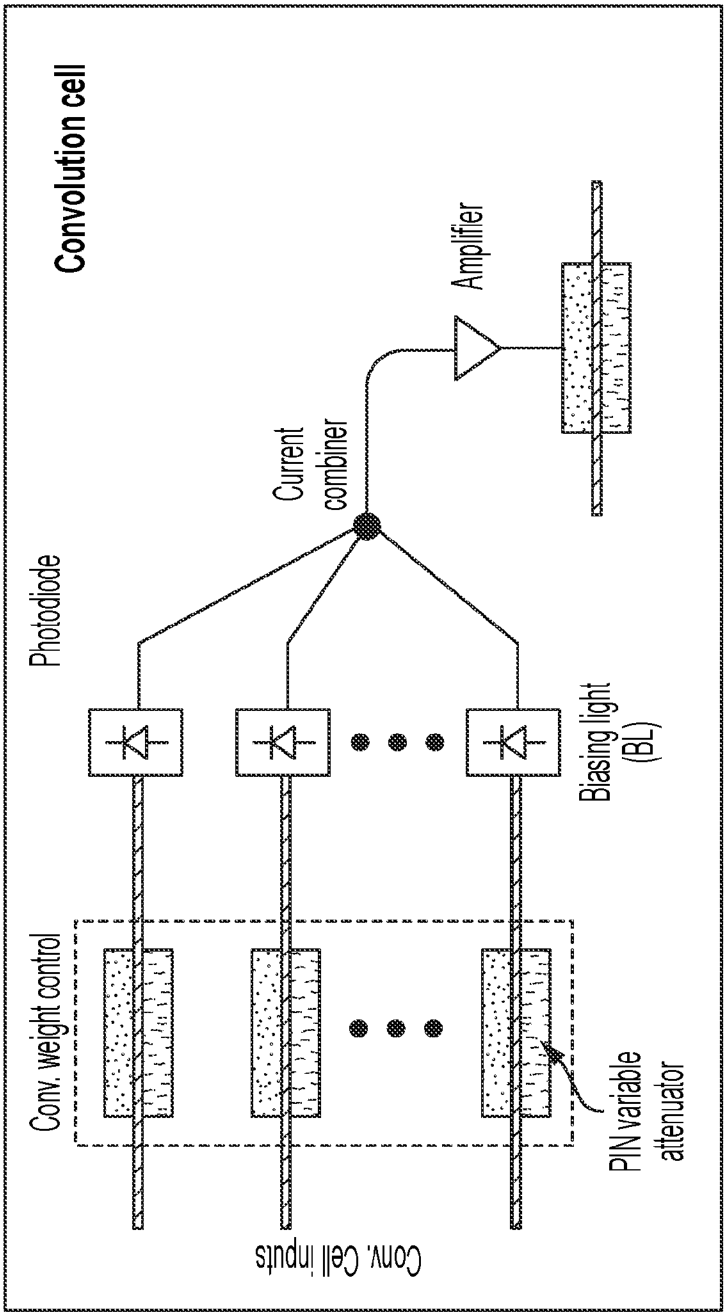

FIG. 3B shows one embodiment of the schematic of the disclosed CC, where an array of current controlled p-doped-intrinsic-n-doped (PIN) variable optical attenuators [8] are used to adjust the amplitude of the optical signals. The measured insertion loss of each PIN attenuator can be adjusted from 1 dB to 32 dB. The output of each PIN attenuator is photo-detected using a SiGe photodiode other types of photodetectors/photodiodes can also be used. The photocurrent of the 12 photodiodes are combined (by hard-wiring their outputs), effectively realizing the inner product of the input optical signals and the correlation weight matrix set by the current of the PIN attenuators. This combined photocurrent is then converted to a voltage and amplified using a trans-impedance amplifier (TIA). The amplified photo-current is used to drive the PIN variable attenuator. In this case, the output of the CC will be in the optical domain. Note that each CC has a separate biasing light (BL) input to improve the signal-to-noise ratio for the neurons of the first layer. The performance of the individual photonic devices are discussed later.

Electronic-Photonic Neuron

Figure 3C:
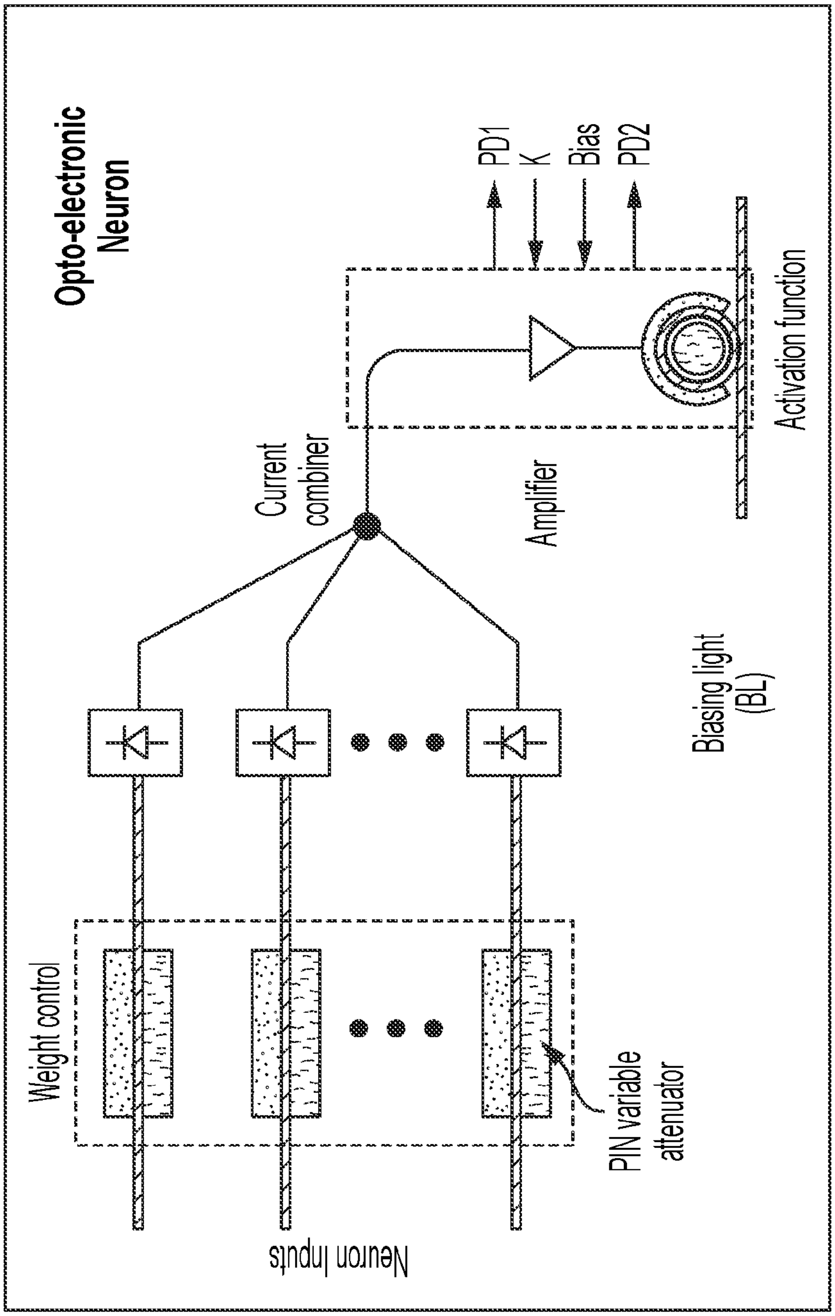
Figure 4A:
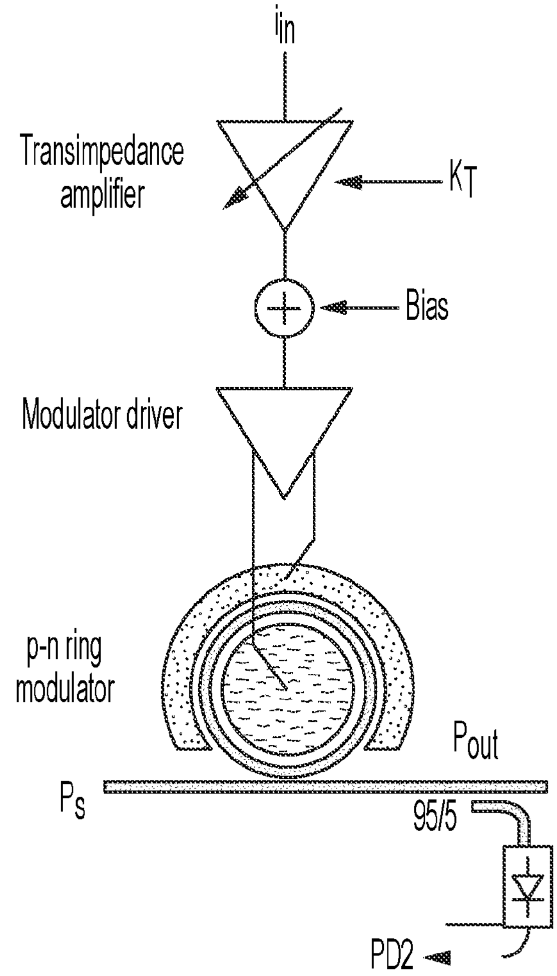
FIGS. 4A-4E provide (FIG. 4A) an example block diagram of the disclosed photonic-electronic non-linear activation function, (FIG. 4B) an example structure of the previously designed and fabricated p-n ring modulator integrated on IME process, (FIG. 4C) example measured performance of the fabricated p-n ring modulator, an example opto-electronic non-linear activation function, (FIG. 4D) an example non-linear activation function, and (FIG. 4E) an example structure for complex signal analysis where both amplitude and phase of the electric field of light is processed.
Figure 4B:
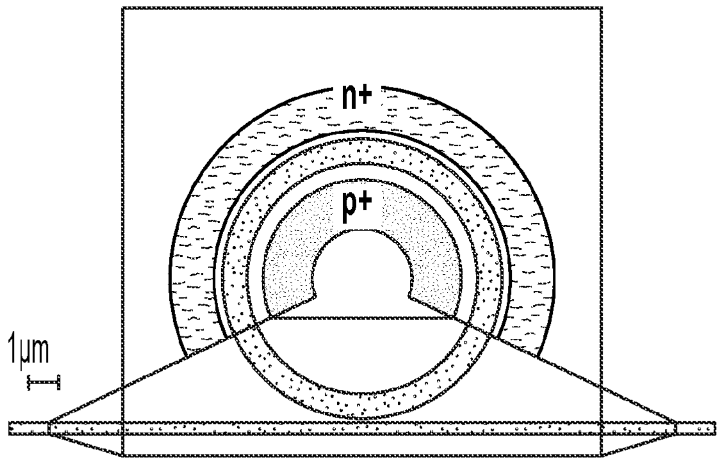
Figure 4C:
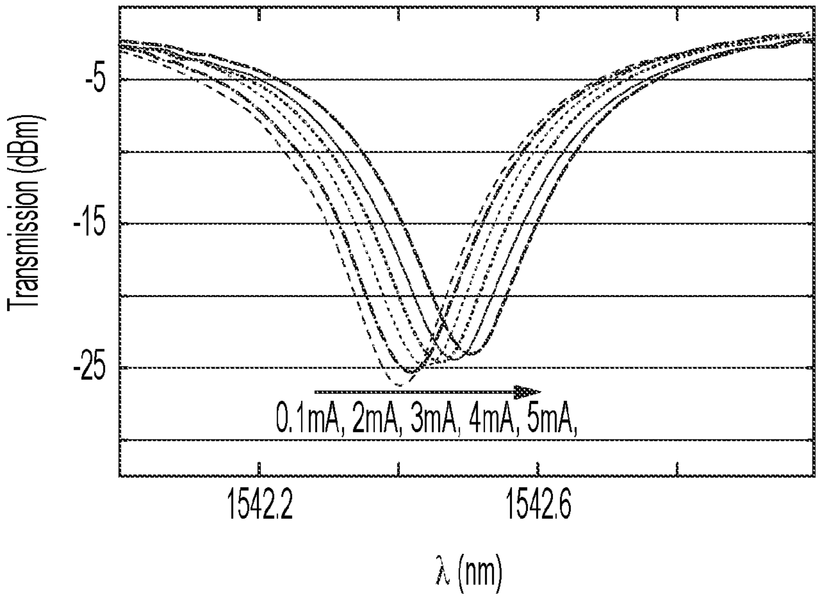
Figure 4D:
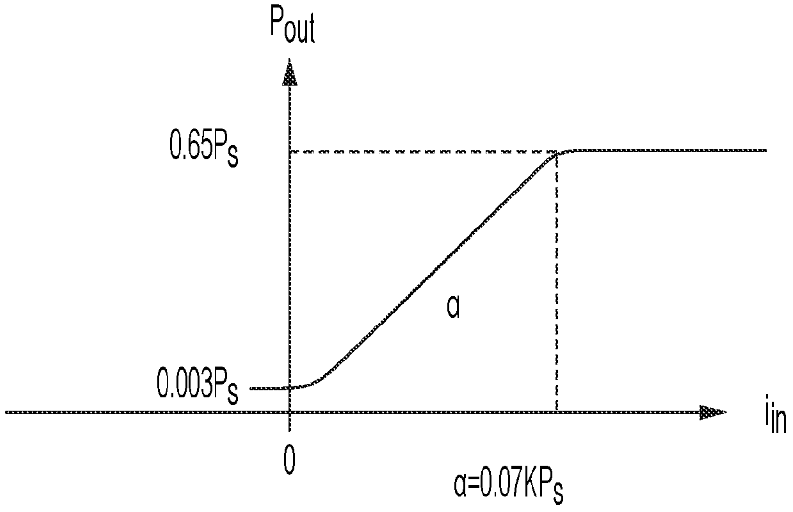

FIG. 3C shows one embodiment of the conceptual schematic of the disclosed electronic-photonic neuron. An array of current controlled PIN variable optical attenuators are used to adjust the amplitude of the optical signals according to the applied weight vector. Other types of attenuators or light modulators or switches can also be used. The output of PIN attenuators are photo-detected using a SiGe photodiode. The non-linear activation function is realized in the mm-wave domain and the signal is up-converted back to the optical domain to form the neuron output. Each photonic neuron has a separate biasing light (BL) input to ensure all neuron outputs have the same signal range enabling the scalability to many number of series layers. Ideally, the non-linear activation function should be implemented in the optical domain to minimize the computation time. However, since semiconductor optical amplifiers cannot be implemented in a silicon-based process, realization of the non-linear activation function in the optical domain is not practical due to typically small available on-chip optical power resulting in a weak non-linear effect. FIG. 4A shows the schematic of one embodiment of the electro-optic circuit used to realize the activation function. The photocurrents are combined (by hard-wiring their outputs) and routed to the input of a trans-impedance amplifier (TIA). An adjustable voltage representing the neuron bias is added to the TIA output. A ring modulator driver further amplifies the TIA output and drives the p-n modulator (FIG. 4B). In another embodiment, p-n modulator may be replaced with other types of modulators and devices such as disk modulator, p-i-n modulators, interferometer-based modulators or other types of resonance and non-resonance electro-optic devices. The input light to this p-n ring modulator, the biasing light (BL), is coupled into each neuron in the system separately and has the same power for all electronic-photonic neurons. This BL signal is generated by equally dividing a laser output (emitting at 1550 nm) coupled into the chip though a separate grating coupler. Note that the separate per neuron biasing light is essential for the operation of the multi-layer networks as it ensures the output of all neurons to have the same range of values regardless of the location of a neuron within the deep neural network. Consider the case that the current combiner output is $i_{in}$. In this case, the ring modulator driver output current is written as $i_{mod}=i_{in}K_TK_d$, where $K_T$ and $K_d$ are the gain of the TIA and the modulator driver gain, respectively. From the measured response of the p-n ring modulator (in FIG. 4C), applying 9 mA of current tunes the ring providing more than 20 dB amplitude change. For the case that the notch in the p-n modulator response is aligned with the input wavelength, the output power to the ring modulator is written as $P_{out}=0.003P_s$, where $P_s$ is the BL power (as the input power to the ring modulator). For the case that $i_{mod}=9$ mA is applied to the ring modulator, the ring modulator output power is increased to $P_{out}=0.65P_s$ which is the largest possible modulator output power (as the laser wavelength is well outside of the notch) and for larger modulator currents, $P_{out}$ does not change. The resulting non-linear activation function is shown in FIG. 4D. In another embodiment of neurons in the disclosed system, some forms of optical non-linearity can be implemented if optical gain material is available (hybrid-integrated with silicon or other implementation platforms).

Figure 4E:
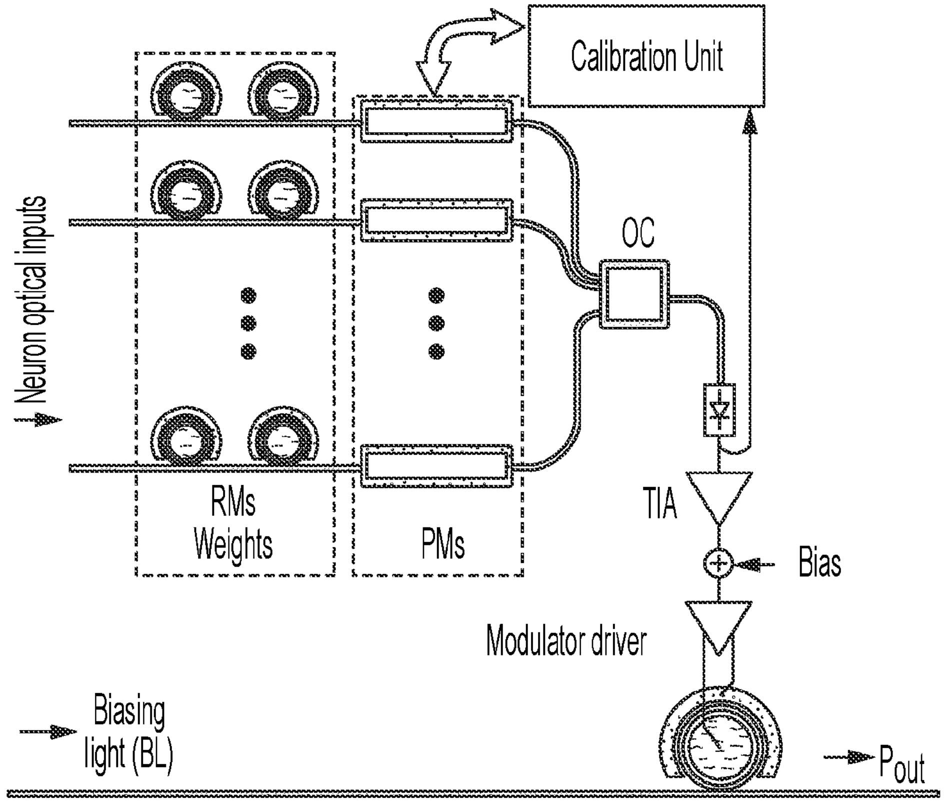

In another embodiment of the neuron in this disclosure, neurons can be used to perform complex signal analysis where both amplitude and phase of electric field of light is processed. An example is shown in FIG. 4E.

When the input current to the TIA, $i_{in}$ is small enough (less than a certain threshold), the output power is set to $P_{out}=0.003P_s$. As $i_{in}$ increases, the modulator output power increases almost linearly as $P_{out}=P(1+0.07Ki_{in})$, where $i_{in}$ is in mA and $K=K_TK_d$. For large enough $i_{in}$, the electronic-photonic neuron output saturates at $P_{out}=0.65P_s$. Note that the shape of the activation function can be adjusted by changing the TIA gain, the BL power ($P_s$), and the DC current at the modulator driver output. The DC part of the modulator driver current can be used to adjust the relative location of the notch with respect to the wavelength. For $P_{out}<0.65P_s$, corresponding to the non-saturated response, the activation function can be approximated by the rectified linear unit (ReLU), which is a known activation function for neural networks [12]. For the case that $P_{out}$ includes the saturation region in FIG. 4D, the activation function is similar to a biased sigmoid function which is also a well-known activation function commonly used in neural networks [12]. As shown in FIG. 4A, two control signals to set “Bias” and “K” (corresponding to the TIA gain), and input current, $i_{in}$, and the read-out signal, PD2, are used during the photonic neural network training phase (discussed later).

The inventors have also deigned a TIA and ring modulator driver as one block in GlobalFoundries GF9WG CMOS SOI process with simulated bandwidth of 27 GHz and current gain of 10 A/A. This disclosure include other types of TIAs and amplifies used between the photodiodes and modulating device within a neuron.

Classification Time

For the deep neural network in FIG. 3A, the computation time in each photonic-electronic neuron is limited by the bandwidth of the electronic circuitry within the activation function. Therefore, it is desired to increase the bandwidth of the electronic blocks as well as the photodiode and ring modulators as much as possible. The inventors have designed and fabricated SiGe photodiodes at 1550 nm in the GF9WG process with measured responsivity and bandwidth of 0.8 A/W and 32 GHz, respectively. Also, the p-n ring modulator implemented on the GF9WG process have a measured bandwidth of 30 GHz. Furthermore, the simulations show that the GF9WG process offers an $f_{max}$ of about 200 GHz enabling reliable TIA and modulator driver designs with bandwidths exceeding 30 GHz. Using these photonic components and mm-wave design techniques, an overall bandwidth of larger than 15 GHz is achievable corresponding to a per-neuron computation time of less than 67 ps. Since the computation for all neurons of a layer is done in parallel, and including the bandwidth of the input convolution cells, the total classification time for a 3 layer deep photonic neural network with mm-wave enabled activation functions, regardless of the number of neurons per layer, can be estimated to be under 280 ps (i.e. under 67 ps per layer and about 67 ps for the convolution layer).

Implementation Platform, Prior Works, and System Integration

Figure 5:
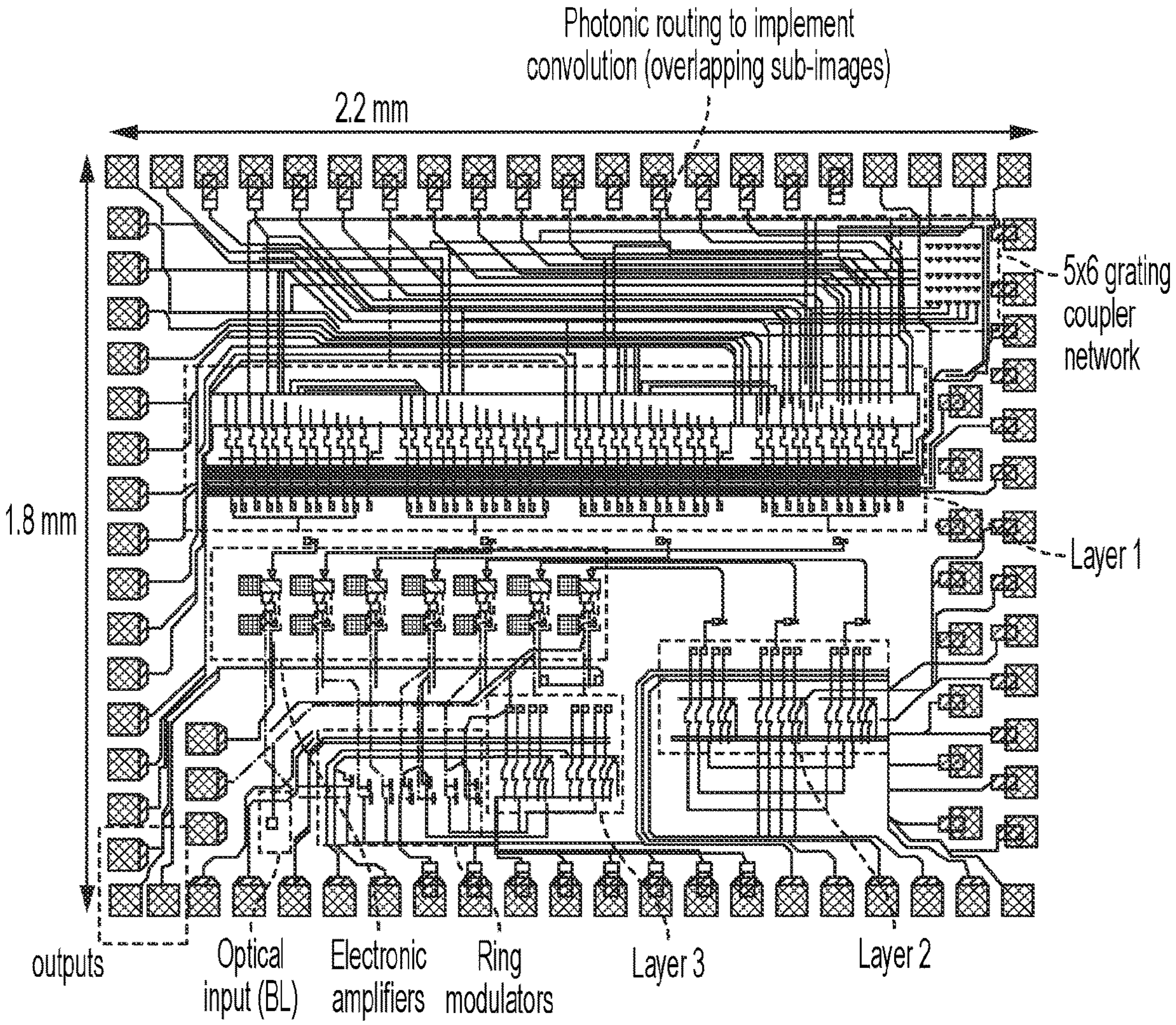
FIG. 5 provides a layout of an example designed and taped-out mmWave-photonic deep learning network for direct image classification.

Over the past few years, the inventors have designed, implemented, and measured many photonic devices and components on GlobalFoundries GF9WG CMOS SOI process as well as other photonic and photonic-enabled CMOS processes and created Verilog A models for many photonic devices based on their measured or simulated performances. On this process, electronic and photonic devices and blocks can be co-simulated using Cadence tools. The same approach has been used to design and successfully demonstrate a few monolithically co-integrated electronic-photonic systems on GlobalFoundries GF7SW CMOS SOI process as well as hybrid-integrated electronic-photonic systems. The inventors will use GF9WG process to implement the photonic deep learning networks. To validate the entire design of the photonic deep learning network to be implemented in the first step (in FIG. 3A), the inventors have designed and taped-out the entire system in GF9WG process. FIG. 5 shows the layout of the designed and taped-out photonic deep learning network, where all photonic and electronic/mm-wave components were co-integrated. Different blocks and sub-systems are identified. One of the challenging tasks here is the design of the photonic waveguide routing network to implement convolution. In the final design, the path-to-path loss is under 1.5 dB. The performance of the system can be fully simulated using Cadence tools. The performance of photonic devices and some of the features of the GlobalFoundries GF9WG CMOS-SOI process are summarized in Table 1, attached hereto. In other embodiments of this disclosure, other electronic-photonic or photonic fabrication technologies (or in-house fabrication) can be used for system implementation. Examples include but not limited to GlobalFoundries 45CLO process, iHP EPIC process, Tower semiconductor SiPho process, AMF photonic process and more.

Classification Phase: Forward Propagation

In this section, an example of the classification of the 6×5-pixel handwritten numbers is used to explain the principle of operation of the forward propagation process for the system taped-out and to be demonstrated. As the target image is formed on the input 6×5 grating coupler array, optical waves are coupled into the input waveguides, passed though the routing network to generate 108 optical signals (corresponding to 12 overlapping 3×3 sub-images) and arrive at 12 convolution cells used to compute the convolution. The outputs of the convolution cells are arranged into 4 rows of 3 optical signals and routed to the input of 4 neurons of the input layer. If the output of the 6×5 grating coupler array is rearranged into a column vector, $P_x$ (of size 30×1), twelve different 9×30 matrices of $C_1$ to $C_9$ representing the distribution network (including the corresponding optical losses) can be defined to find the intensity of light at the convolution cells. In this case, the input to the $i^{th}$ convolution cell is written as $Q_i=C_i\times P_x$, where $Q_i$ is a 9×1 vector. Within each convolution cell, the inner product of the input vector and the 1×9 convolution weight vector, $W_{conv}$, is calculated as the cell output as $J_i=W_{conv}\times Q_i=W_{conv}\times C_i\times$ $P_x$. Note that the convolution weight vector is the same for all 12 convolution cells and does not change during the training and classification phases. The 12 outputs of the convolution cells are arranged into four 3×1 arrays, each used as the input to one of the four electronic-photonic neurons of the input layer as $I_1=[J_1J_2J_3]^T$, $I_2=[J_4J_5J_6]^T$, $I_3=[J_7J_8J_9]^T$, and $I_4=[J_{10}J_{11}J_{12}]^T$, where $I_1$, $I_2$, $I_3$, and $I_4$ represent 3×1 input vectors for the four neurons in the input layer. The output of each neuron is generated by passing the weighted sum of its inputs though the non-linear activation function. Thus, the output of $i^{th}$ neuron in the first layer is written as $O_{in}$, $=f(W_{in,i}\times I_i)$, where $W_{in,i}$, and $f(\cdot)$ represent the 3-element weight vector for the $i^{th}$ neuron in the input layer (i=1, 2, 3, 4) and the activation function, respectively. Similarly, the output of the $i^{th}$ neuron in the hidden layer ($2^{nd}$ layer) is written as $O_h$, $=f(W_{h,i}\times[O_{in,1}\ O_{in,2}\ O_{in,3}\ O_{in,4}]^T)$, where $W_{in,i}$ represent the 4-element weight vector in the $i^{th}$ neuron in the hidden layer (i=1, 2, 3) and T denotes transpose operation. In the matrix format, assuming that $O_{in}=[O_{in,1}\ O_{in,2}\ O_{in,3}\ O_{in,4}]^T$, and $O_h=[O_{h,1}\ O_{h,2}\ O_{h,3}]$, then $$O_h^T = f(W_h O_{in}),$$

where $W_h$ is a 3×4 matrix whose rows are $W_{h,i}$ vectors for i=1, 2, 3. Finally, the outputs of the output layer ($3^{rd}$ layer) are calculated as $O_o$, $=f(W_{o,i}\times[O_{h,1}\ O_{h,2}\ O_{h,3}]^T)$, where $W_{o,i}$ represent the 3-element weight vector in the $i^{th}$ neuron (i=1, 2) in the output layer. In the matrix format, assuming that $O_o=[O_o,\ O_{o,2}]^T$, then $O_o=f(W_o\times O_h)$, where $W_o$ is a 2×3 matrix whose rows are $W_{o,i}$ vectors for i=1, 2. The outputs of the $3^{rd}$ layer, $O_o$, and $O_{o,2}$ are used to determine the class of the input image. While the distribution network matrices ($C_1$ to $C_9$) depend only on the layout of the distribution network, and the convolution weight vector is pre-defined and is unchanged during the training and classification, the weight vectors for all other layers (i.e. $W_{in,i}$, $W_{h,i}$, and $W_{o,i}$) are calculated during the training phase and updated electronically by setting the currents of the optical attenuators. Note that in this work, similar to the typical CNN, the weights of the convolution cells in the convolution layers are set to the same values, however, in another embodiment, the weights could be different for different convolution cells.

Training Phase: Backward Propagation

The array of 6×5 grating couplers can be similar to the one the inventors used for coherent imaging [5] but with a larger fill-factor. In this case, if an amplified laser emitting 50 mW at 1550 nm is used for illumination using a narrow-beam collimator from 0.5 m distance, once a focused image is formed, each pixel of the on-chip grating coupler array receives about 0.5 μW. To examine the performance of the photonic neural network in FIG. 3A using Cadence tools, a file containing 2500 gray-scale 6×5 images of handwritten numbers (1800 from training and 700 for validation) are first scaled to emulate a received power of 0.5 μW per grating coupler and then are imported to Cadence to serve as the input signals to the disclosed photonic neural network and are entered the network as optical waves right after the input grating couplers.

The labels corresponding to the images are also loaded into the Cadence simulator and are used for supervised training. The entire system is realized in Cadence using the Verilog-A models of the photonic components next to the electronic devices instantiated from the GF9WG process PDK and simulated using Cadence SpectreRF tool. Images in the training set are fed to the system one-by-one. Digital computation and weight setting is performed using VerilogA blocks emulating an off-chip microcontroller. First, random initial weights (within the valid expected range) are set for all neurons. Then, the images within the training set (1800 images) are input to the system one-by-one. For each image, after forward propagation is completed, the outputs of the network, $O_o$, and $O_{o,2}$, are calculated and read by the microcontroller (emulated using VerilogA blocks in Cadence simulation).

Figure 6:
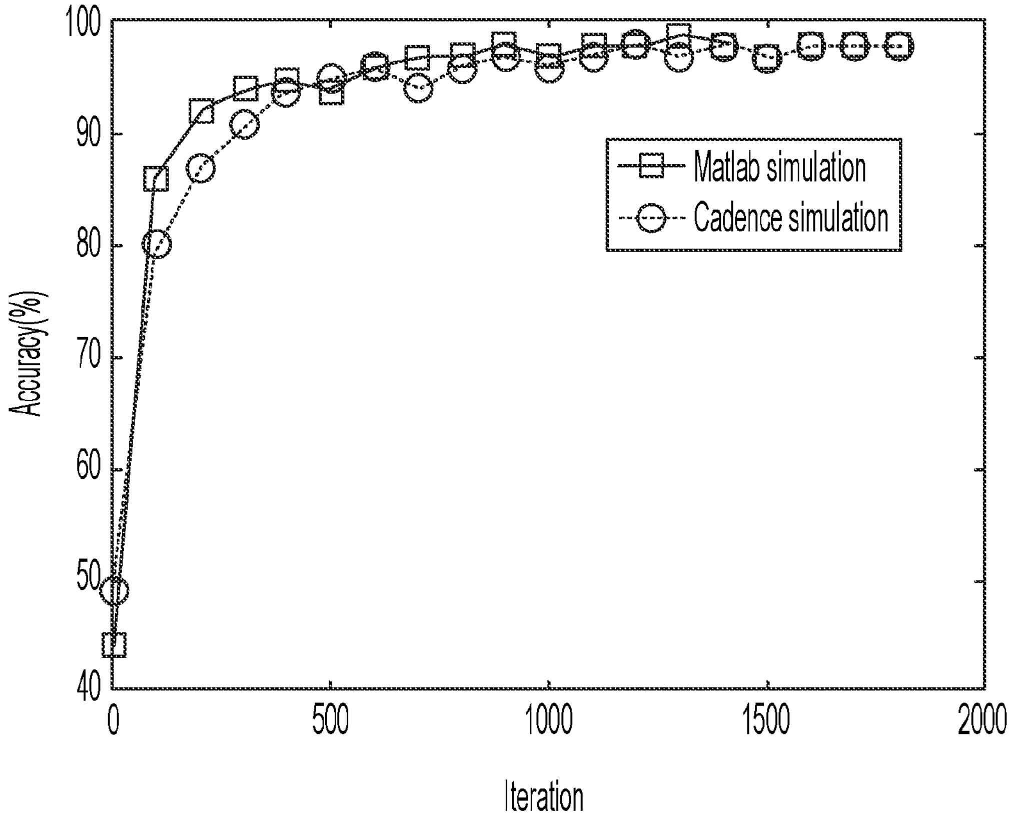
FIG. 6 provides a comparison between classification accuracy for Cadence simulation of the system in FIG. 3A and the equivalent Matlab simulation.
Figure 7:
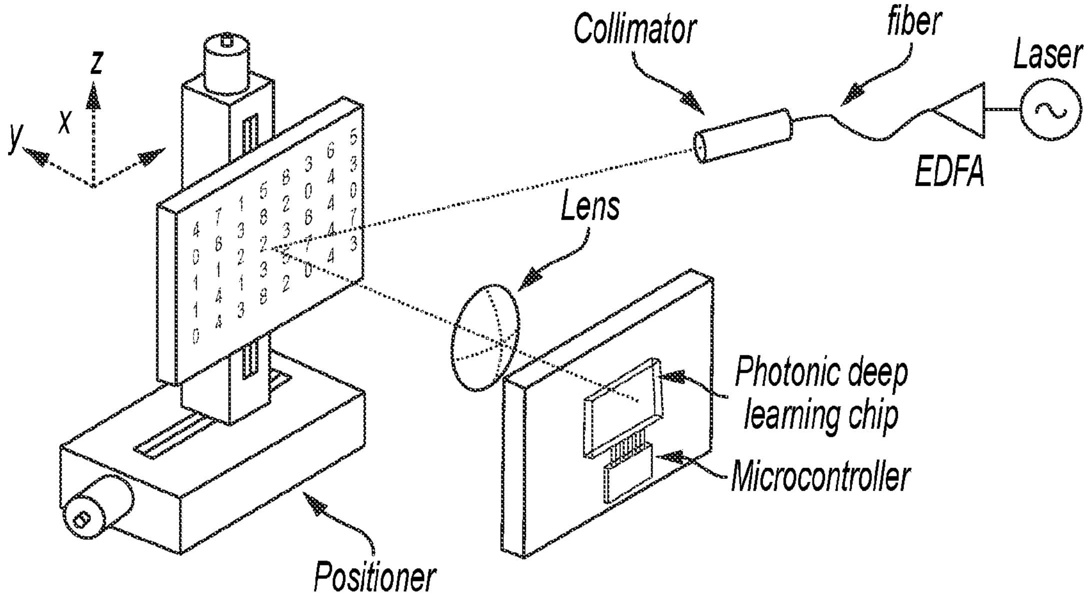
FIG. 7 provides an experimental setup to perform training and classification using the system realized by the GF9WG chip.

Output error signals, $e_{o,1}$ and $e_{o,2}$, are calculated by subtracting the network outputs from the target values Target1 and Target2 (that are hard-coded in the VerilogA code), that is, $e_o=[e_{o,1}\ e_{o,2}]^T=[\text{Target1}-O_{o,1}\ \text{Target2}-O_{o,2}]^T$. At this point, the error signals will be propagated backward and used to update the weight vectors for photonic-electronic neurons within different layers. First, the output error signals are used to find the equivalent error signals referred to the hidden layer based on the corresponding weights [9]. The current weight vectors are stored in the microcontroller (emulated by VerilogA blocks in Cadence). Therefore, the equivalent error signals back propagated to the hidden layer are calculated as $$e_h = W_{o,nr}^T \times e_o, \text{ where } e_h = [e_{h,1} e_{h,2} e_{h,3}]^T \text{ and } W_{o,nr}^T = \left[\frac{W_{0,1}^T}{\sum W_{o,1}} \frac{W_{o,2}^T}{\sum W_{o,2}}\right]$$

is the normalized output layer weight function with $\Sigma W_{o,i}$ representing the sum of all 3 elements of $W_{o,i}$. Using the gradient decent method with a quadratic cost function [9], and assuming a ReLU activation function (see FIG. 4D, the weight vector for the output layer can be updated as [9]$W_o \rightarrow W_o+L_r\alpha e_o\times O_h$, where $L_r$ is the learning rate and $\alpha=0.07Ki_{in}$ is the slope of the ReLU function defined in FIG. 4D. This disclosure covers other non-linear functions such as sigmoid and its derivative, exponential, and more. Note that the microcontroller reads the output of the hidden layer, vector $O_h$, trough PD2 as shown in FIG. 4A. Similarly, the error at the output of the hidden layer can be back-propagated and the updated weights for the first and second layers can be calculated. Once all the weight vectors are updated within the neural network, the next image is loaded into the network and the training continues. In Cadence simulation, the VerilogA block emulating the microcontroller is programed to run a training-validation task for a two-class classification of hand-written ones and zeros. In this case, the photonic neural network is trained in multiple phases using batches of 100 images (out of 1800 images in the training set). After each training phase (corresponding to 100 iterations), the training is paused and the network uses the last updated set of weights to classify 700 images of the validation set (that are not included in the 1800 training set). At the end of validation, the classification accuracy, which is defined as the ratio of the correctly classified images to the total number of images (in the validation set), is recorded and next training phase starts. After 18 training phases (corresponding to 1800 images), 18 validations are performed. FIG. 6 shows the resulting classification accuracy for Cadence simulation of the system in FIG. 3A and the same architecture implemented in Matlab where a good agreement between Matlab and Cadence simulations is observed. This test confirms that the electronic-photonic deep neural network taped-out on GlobalFoundries GF9WG CMOS-SOI process can robustly perform image recognition using the provided two class data set. Once the chips are delivered (late June 2020), the training and classification test will be performed using the experimental setup shown in FIG. 7, where a motorized X-Y stage moves the handwritten images in front of the chip during training and classification phases. A lens is used to form the images on the input grating couple array.

Photonic-Electronic Instantaneous Training

Figure 8:
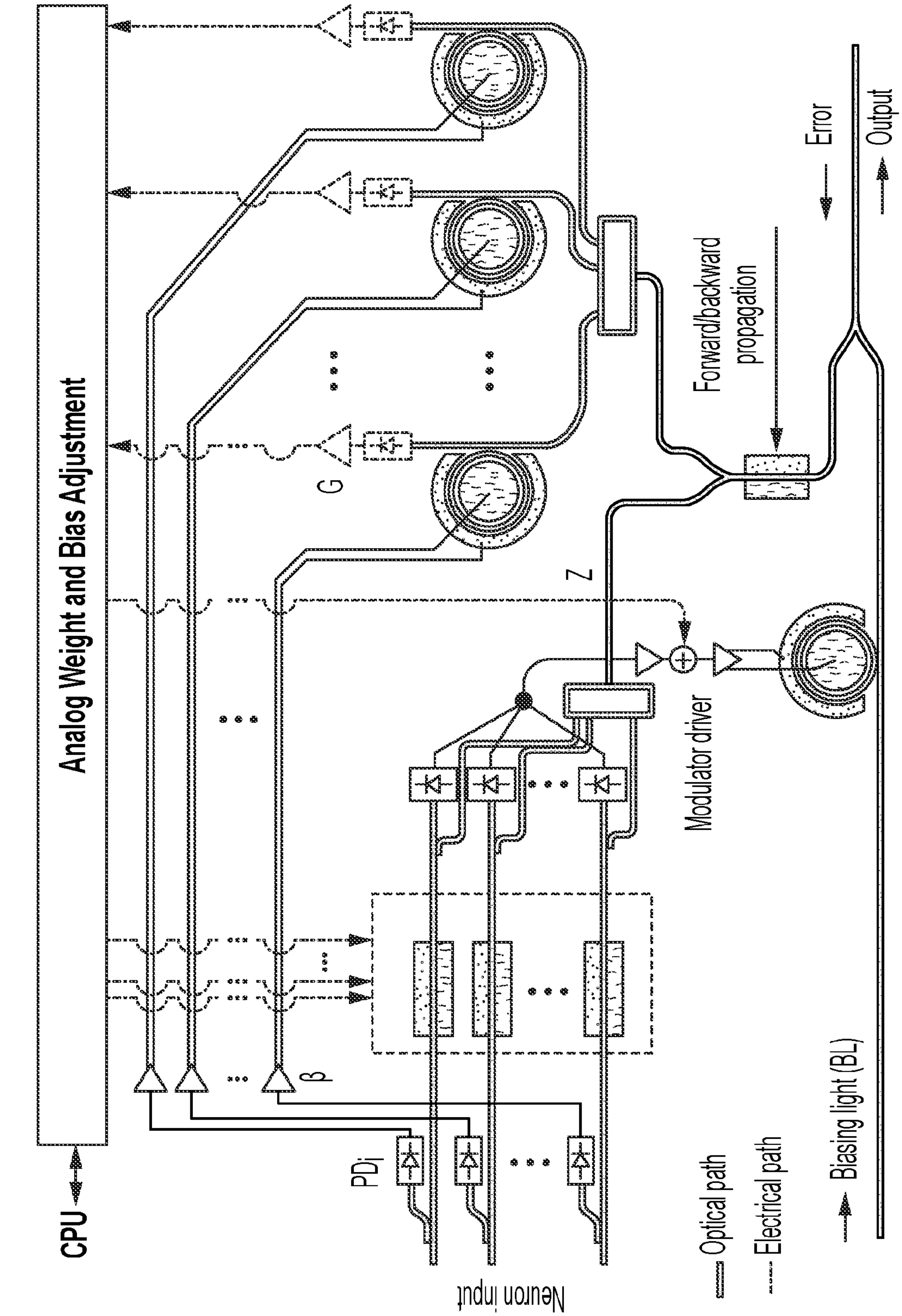
FIG. 8 provides an example structure of a disclosed photonic-electronic neuron supporting both forward and backward optical wave propagation enabling instantaneous training and classification.

In the previous section, an all-electronic training including the error back propagation and neuron weight update process was explained and used to verify the photonic-electronic forward propagation using Cadence tools. For deep networks with many layers and large number of neurons per layer, all-electronic training may slow down the training process significantly. In this section, the inventors disclose anovel photonic-electronic architecture capable of backward propagation calculation. FIG. 8 shows the same neuron in FIG. 3C with added photonic backward error propagation capability. While the training using backward propagation can be done entirely in electrical domain, the training time can be significantly reduced if photonic backward propagation calculation is employed.

Consider the case that this neuron is placed in layer M. The error from layer M+1 can enter this neuron in the form of an optical signal. Half of this optical signal is guided to a PIN optical attenuator. This attenuator is set to high attenuation during the forward propagation phase and low attenuation during the back propagation phase to avoid generating errors during the forward propagation phase (classification). The PIN attenuator output at point Z is split into 12 branches with equal powers using a 1×12 MMI coupler splitter (see Table 1). Each output of the MMI is then coupled to one of the neuron input waveguide using a 50/50 directional coupler. Assuming the optical error signal back propagating from the $(M+1)^{th}$ layer to the neuron in the $M^{th}$ layer to have the power of $P_o$, for an N input neuron, the back propagating optical signal in each output of the MMI (after splitting) will have a power of $$\frac{P_o}{4N}.$$

Since the PIN attentuators setting the signal weights are bi-directional, the error signals back propagated to the input of the neuron can be written as $$\frac{P_o}{8N}W_i,$$

where $W_i$ represent the weight in the $i^{th}$ input and the factor ⅛ represent the effect of two Y-junctions before point Z and the 50/50 coupler after the MMI. Similarly, these error signals continue to back propagate layer by layer to get to the first layer. Note that the power splitting performed by the MMI can be viewed as the error normalization as the power in each input path is divided by the total number of the neuron inputs.

After error back propagation, the weights need to be updated. To explain the weight adjustment process, consider the output and hidden layers for the network shown in FIG. 3A (but implemented with modified neurons shown in FIG. 8). This is shown in detail in FIG. 9. Starting from the right side of this figure, to calculate $e_{o,1}$, the optical signal representing the $\text{Target}_1$ is 180° phase shifted using a thermal phase modulator and combined with the output of the first neuron in the output layer, $o_{o,1}$, using a Y-junction. Similarly, $e_{o,2}$ is calculated. Defining the cost function as $$E_{total} = \frac{1}{2}e_{o,1}^2 + \frac{1}{2}e_{o,2}^2,$$

the goal is to use the gradient descent method to find the amount that each weight should be adjusted to minimize $E_{total}$. In another embodiment, other optimization methods could be used for weight calculations. In this case, weight W should be adjusted by $$\Delta w = \frac{\partial E_{total}}{\partial w}.$$

For example, for the first neuron of the output $\partial_w$ layer, $$\Delta w_{o,1,1} = \frac{\partial E_{total}}{\partial w_{o,1,1}}.$$

Figure 9:
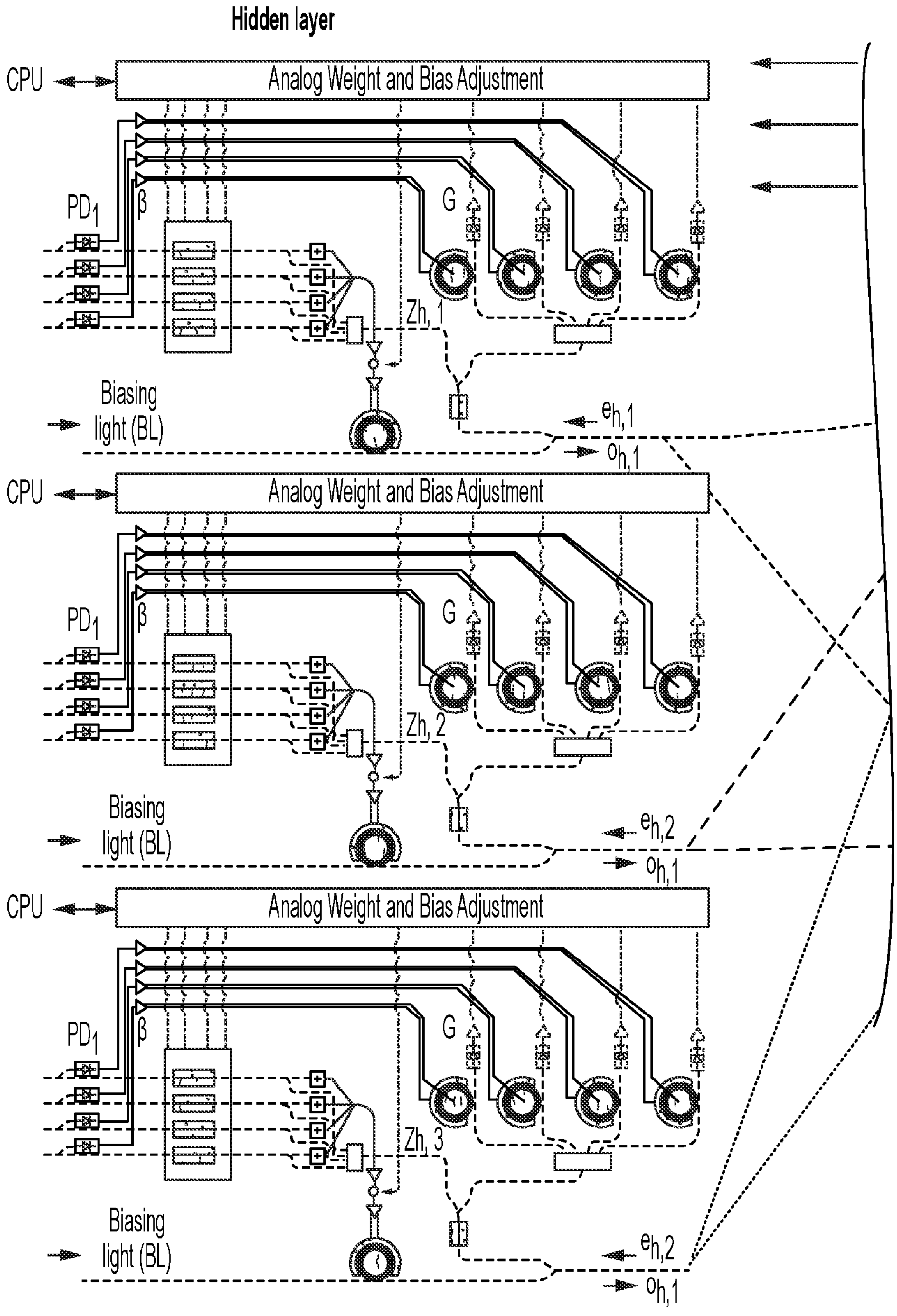
FIG. 9 provides the output and hidden layers for the network shown in FIG. 3A but implemented using photonic-electronic neurons shown in FIG. 8.
Figure 9:
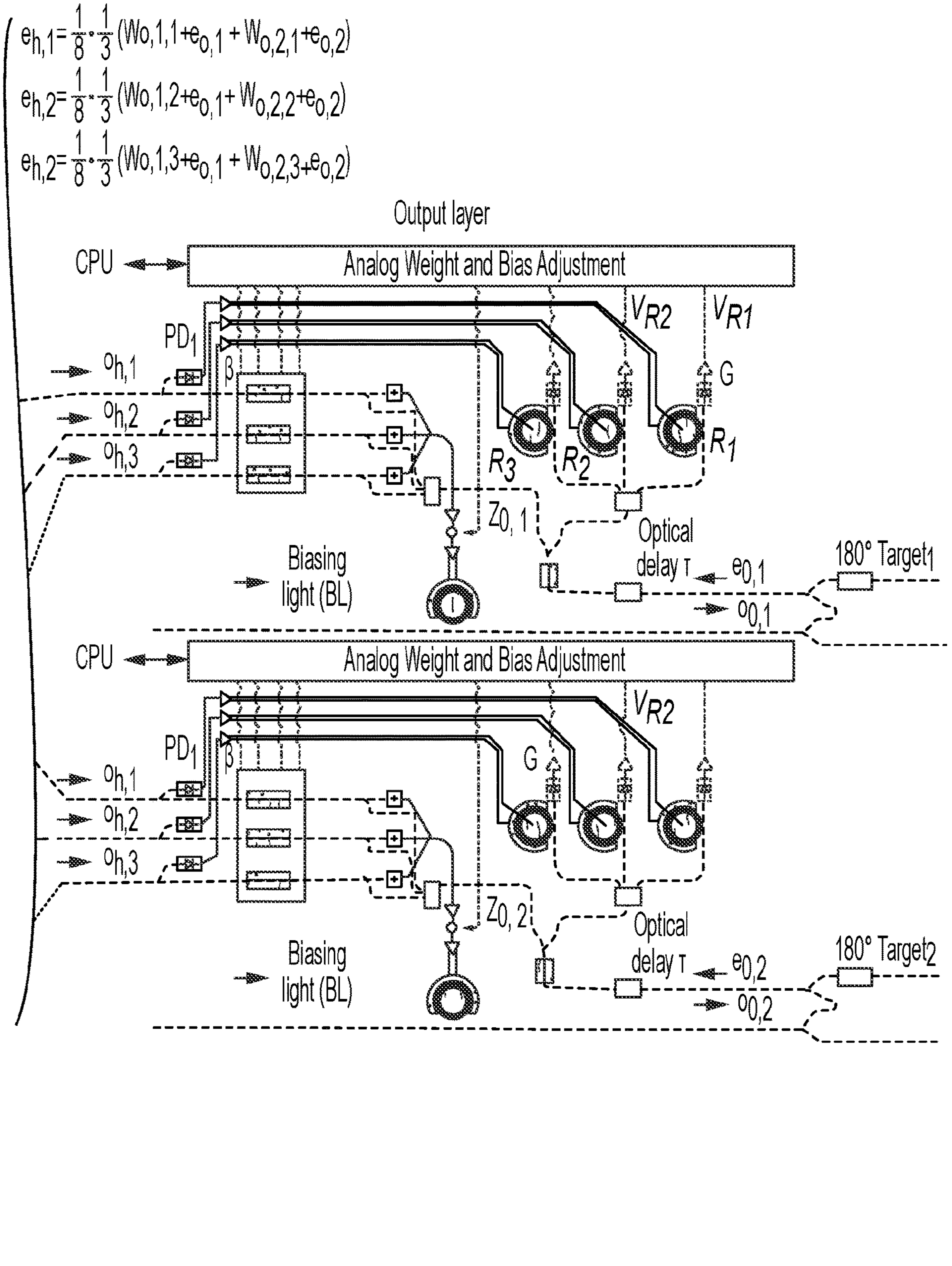

Defining the MMI output as $z_{o,1}=0.5(w_{o,1,1}o_{h,1}+w_{o,1,2}o_{h,2}+w_{o,1,3}o_{h3})$, the ${}_{o,1,1}$ output of this neuron is written as $o_{o,1}=f(Rz_{o,1})$, where f(·) represents the ReLU activation function. For this case, the change in $w_{o,1,1}$ is written as $$\Delta w_{o,1,1} = \frac{\partial E_{total}}{\partial w_{o,1,1}} = \frac{\partial E_{total}}{\partial o_{o,1}} \times \frac{\partial o_{o,1}}{\partial z_{o,1}} \times \frac{\partial z_{o,1}}{\partial w_{o,1,1}} = ae_{o,1}o_{h,1},$$

where α is the slope of the ReLU function (corresponding to its derivative). Then, this weight can be adjusted as $w_{o,1,1} \rightarrow w_{o,1,1} - L_r \Delta w_{o,1,1}$. Interestingly, $L_r\Delta_{o,1,1}$ can also be calculated opto-electronically. As shown in FIG. 9, the output of the first neuron in the hidden layer, $o_{h,1}$, connected to the first input of the first neuron of the output layer, is split into two branches. The bottom branch is used for classification (in forward propagation phase), and the top branch, which is used for training (in the backward propagation phase), is photo-detected, amplified, and used to drive the ring modulator $R_1$. The input to this ring modulator is a part of the error signal $e_{o,1}$, guided to the ring modulator after passing through a MMI splitter. A Y-junction is placed before this MMI to provide half of the error signal $(e_{o,1})$ power for back propagation of the error signal and the other half for updating the weights within the output layer. The output power of ring modulator $R_1$ can be written as $$P_{R_1} = R\alpha\beta G_M\left(\frac{1}{6}\right)e_{o,1}\left(\frac{1}{2}\right)o_{h,1},$$

where R, β and $G_M$ are the $PD_i$ responsivity, the gain of the trans-impedance amplifier, and the gain of the ring modulator $R_1$, respectively. The output of the ring modulator $R_1$ is photo-detected and amplified resulting in a mm-wave voltage that can be written as $$V_{R_a} = \frac{1}{12}R^2\alpha\beta G G_M e_{o,1}o_{h,1},$$

where G is the gain of the amplifier after the photo-diode. Defining $$L_r = \frac{1}{12} R^2 \beta G G_M,$$

this voltage can be written as $V_{R_1} = L_r \alpha e_{o,1} o_{h,1} = -L_r \Delta w_{o,1,1}$. Therefore, the learning rate, $L_r$, can be adjusted by changing the gain of the amplifiers. This mm-wave voltage is connected to an on-chip analog weight and bias adjustment unit. This unit changes the value of $w_{o,1,1}$, which is stored in a capacitor, to $(w_{o,1,1} - L_r \Delta w_{o,1,1})$. Similarly, all weight vectors in the output layer are updated. As shown in FIG. 9, the optical error signals also propagate back to the hidden and input layers and the same method can be used to update the weight vectors in the corresponding layer. Note that an optical delay line is used to delay the error signals in the output layer to ensure that the back propagation phase does not occur during the forward propagation phase.

Comparison with the State of the Art

The forward propagation time is mainly limited by the bandwidths of the photodiode, p-n ring modulator, and the mm-wave blocks within the activation functions. To provide a fair comparison between the performance of a deep network implemented on a state-of-the-art GPU platform and a similar photonic-electronic deep network, the inventors have used an NVIDIA Titan V (5120) GPU [10] to implement a typical 7 layer deep network to classify 256×256-pixel images. Using this GPU, the training (3000 iterations) and classification (99%) takes 20 min, and 3.8 ms, respectively. The power consumption of this GPU is about 65 W. For the same performance, the training and classification using disclosed photonic deep network are estimated to take 2.8 ms and 0.5 ns, respectively. Compared to GPU platform, the power consumption is reduced from 65 W to 1.2 W.

Photonic-Electronic Deep Networks for 3D Image Classification

In the second step, the array of the grating coupler can be replaced with an alternative device, e.g., an optical phased array (OPA). In this case, both amplitude and phase of the target object would be available to the deep network enabling interesting applications such as 3D image classification and phase contrast image classification. Also, the OPA enables instantaneous free-space image correlation calculation and/or can be used for tracking and classification of fast-moving objects within a large field-of-view. The following references are provided for background and are incorporated herein by their entireties for any and all purposes.

EXEMPLARY EMBODIMENTS

The following embodiments are illustrative only and do not necessarily limit the scope of the present disclosure of the appended claims.

Embodiment 1. A method for artificial neural network computation, comprising: receiving an array of input data; processing the input data in an optical and electro-optical domain; applying the processed input data through a plurality of electronic-photonic neuron layers in a neural network; and generating an output comprising classification information from the neural network.

Embodiment 2. The method of Embodiment 1, wherein the input data comprises at least one of optical data audio data, image data, video data, speech data, analog data, and digital data.

Embodiment 3. The method of any one of Embodiments 1-2, further comprising upconverting the input data to be directly processed in the optical domain.

Embodiment 4. The method of Embodiment 3, wherein the upconverting occurs without digitization or photo-detection.

Embodiment 5. The method of any one of Embodiments 1-4, wherein the input data is optical data extracted from at least one of a data center connection, a fiber optic communication, and a 3D image.

Embodiment 6. The method of any one of Embodiments 1-5, wherein, at the input layer, the processed input data is weighted and passed through an activation function.

Embodiment 7. The method of any one of Embodiments 1-6, wherein the activation function is electro-optical or optical.

Embodiment 8. The method of any one of Embodiments 1-7, wherein the input data is complex with amplitude and phase.

Embodiment 9. The method of any one of Embodiments 1-8, wherein a pixel array provides the input data, and the input data is converted to an optical phased array.

Embodiment 10. The method of any one of Embodiments 1-9, wherein processing the input data comprises routing the input data through one or more convolution cells.

Embodiment 11. The method of Embodiment 10, wherein a photonic waveguide routes optical data to the one or more convolution cells Embodiment 12. The method of claim any one of Embodiments 1-11, wherein the plurality of electronic-photonic neuron layers includes at least one training layer and a classification layer.

Embodiment 13. An artificial neural network system, comprising: at least one processor; and at least one memory comprising instructions that, when executed on the processor, cause the computing system to receive an array of input data; process the input data in an optical domain; apply the processed input data through a plurality of electronic-photonic neuron layers in a neural network; and generate an output comprising classification information from the neural network.

Embodiment 14. The system of Embodiment 13, wherein the input data comprises at least one of optical data audio data, image data, video data, speech data, analog data, and digital data.

Embodiment 15. The system of any one of Embodiments 13-14, further comprising upconverting the input data to be directly processed in the optical domain, and the upconverting occurs without digitization or photo-detection.

Embodiment 16. The system of any one of claims 13-15, further comprising a plurality of optical attenuators to adjust the processed input data.

Embodiment 17. The system of any one of Embodiments 13-16, further comprising a bias adjustment unit.

Embodiment 18. The system of any one of Embodiments 13-17, wherein the electronic-photonic neuron layers each comprise a biasing light.

Embodiment 19. The system of any one of Embodiments 13-18, further comprising at least one of a 3D imager, an optical phased array, and a photonic assisted microwave imager.

Embodiment 20. The system of any one of Embodiments 13-19, wherein generating an output has a classification time of less than 280 ps.

Embodiment 21. The system of any one of Embodiments 13-20, wherein, at the input layer, the processed input data is weighted and passed through an activation function.

Embodiment 22. The system of any one of Embodiments 13-21, wherein processing the input data comprises routing the input data through one or more convolution cells, and the plurality of electronic-photonic neuron layers includes a training layer and a classification layer.

REFERENCES

1. M. Idjadi and F. Aflatouni, "Nanophotonic phase noise filter in silicon," *Nature Photonics* 14, pp. 234-239 (2020).
2. M. Idjadi and F. Aflatouni, "Integrated Pound-Drever Hall laser stabilization system in silicon," *Nature Communications* 8, 1209 (2017).
3. F. Ashtiani, Angelina Risi, and F. Aflatouni, "Single-chip nanophotonic near-field imager," *Optica*, vol. 6, no. 10, pp. 1255-1260 (2019).
4. Z. Xuan, R. Ding, Y. Liu, T. Baehr-Jones, M. Hochberg, and F. Aflatouni, "A low-power hybrid-integrated 40 Gb/s optical receiver in silicon," *IEEE Transactions on Microwave Theory and Techniques* (*TMTT*), vol. 66, no. 1, pp. 589-595 (2018).
5. F. Aflatouni, B. Abiri, A. Rekhi, and A. Hajimiri, "Nanophotonic coherent imager," *Optics Express, vol.* 23, no. 4, pp. 5117-5125 (2015).
6. F. Ashtiani, P. Sanjari, M. H. Idjadi and F. Aflatouni, "High-resolution optical frequency synthesis using an integrated electro-optical phase-locked loop," in *IEEE Transactions on Microwave Theory and Techniques*, vol. 66, no. 12, pp. 5922-5932 (2018).
7. Z. Xuan, L. Du, and F. Aflatouni, "Frequency locking of semiconductor lasers to RF oscillators using hybrid-integrated opto-electronic oscillators with dispersive delay lines," *Optics Express*, vol. 27, no. 8, pp. 10729-10737 (2019).
8. F. Aflatouni, B. Abiri, A. Rekhi, and A. Hajimiri, "Nanophotonic projection system," Optics Express, vol. 23, no. 16, pp. 21012-21022 (2015).
9. Tariq Rashid, Make you own neural network, CreateSpace Independent Publishing Platform, 2016.
10. Nvidia CUDA Programming Guide (Versions 4.2 and 9) available at https://developer.download.nvidia.com.

What is claimed:

1. A method for artificial neural network computation, comprising:

receiving an array of input data;

processing the input data in an optical and electro-optical domain;

applying the processed input data through a plurality of electronic-photonic neuron layers in a neural network; and generating an output comprising classification information from the neural network, wherein generating an output has a classification time of less than 280 ps.

2. The method of claim 1, wherein the input data comprises at least one of optical data, audio data, image data, video data, speech data, analog data, and digital data.

3. The method of claim 1, further comprising upconverting the input data to be directly processed in the optical domain.

4. The method of claim 3, wherein the upconverting occurs without digitization or photo-detection.

5. The method of claim 1, wherein the input data is optical data extracted from at least one of a data center connection, a fiber optic communication, and a 3D image.

6. The method of claim 1, wherein, at an input layer, the processed input data is weighted and passed through an activation function.

7. The method of claim 1, wherein, an activation function is electro-optical or optical.

8. The method of claim 1, wherein, the input data comprises amplitude and phase.

9. The method of claim 1, wherein a pixel array provides the input data, and the input data is converted to an optical phased array.

10. The method of claim 1, wherein processing the input data comprises routing the input data through one or more convolution cells.

11. The method of claim 8, wherein a photonic waveguide routes optical data to one or more convolution cells.

12. The method of claim 1, wherein the plurality of electronic-photonic neuron layers includes at least one training layer and a classification layer.

13. An artificial neural network system, comprising:

at least one processor; and at least one memory comprising instructions that, when executed on the processor, cause the computing system to:

receive an array of input data;

process the input data in an optical domain;

apply the processed input data through a plurality of electronic-photonic neuron layers in a neural network; and generate an output comprising classification information from the neural network, wherein generating an output has a classification time of less than 280 ps.

14. The system of claim 13, wherein the input data comprises at least one of optical data, audio data, image data, video data, speech data, analog data, and digital data.

15. The system of claim 13, further comprising upconverting the input data to be directly processed in the optical domain, and the upconverting occurs without digitization or photo-detection.

16. The system of claim 13, further comprising a plurality of optical attenuators to adjust the processed input data.

17. The system of claim 13, further comprising a bias adjustment unit.

18. The system of claim 13, wherein the electronic-photonic neuron layers each comprise a biasing light.

19. The system of claim 13, further comprising at least one of a 3D imager, an optical phased array, and a photonic assisted microwave imager.

20. The system of claim 13, wherein, at an input layer, the processed input data is weighted and passed through an activation function.

21. The system of claim 13, wherein processing the input data comprises routing the input data through one or more convolution cells, and the plurality of electronic-photonic neuron layers includes a training layer and a classification layer.

* * * * *